(12) United States Patent
Nakada et al.

(10) Patent No.: US 11,059,294 B2
(45) Date of Patent: Jul. 13, 2021

(54) LIQUID ABSORBER, LIQUID ABSORBING UNIT, AND LIQUID EJECTION APPARATUS

(71) Applicant: SEIKO EPSON CORPORATION, Tokyo (JP)

(72) Inventors: Shogo Nakada, Nagano (JP); Shinobu Yokokawa, Nagano (JP); Yoichi Miyasaka, Nagano (JP); Shigemi Wakabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/819,380

(22) Filed: Mar. 16, 2020

(65) Prior Publication Data

US 2020/0298572 A1 Sep. 24, 2020

(30) Foreign Application Priority Data

Mar. 18, 2019 (JP) .............................. JP2019-049460
Nov. 28, 2019 (JP) .............................. JP2019-215068

(51) Int. Cl.
*B41J 2/165* (2006.01)
(52) U.S. Cl.
CPC ................................ *B41J 2/16517* (2013.01)

(58) Field of Classification Search
CPC . B41J 2/16517; B41J 2/16508; B41J 2/16523
See application file for complete search history.

(56) References Cited

U.S. PATENT DOCUMENTS

| 5,891,120 A | * | 4/1999 | Chmielewski | ........ A61F 13/535 604/368 |
|---|---|---|---|---|
| 2014/0184694 A1 | | 7/2014 | Takano et al. | |
| 2019/0224644 A1 | | 7/2019 | Ikemoto et al. | |
| 2020/0164653 A1 | * | 5/2020 | Miyasaka | ............ B41J 2/16508 |

FOREIGN PATENT DOCUMENTS

| CN | 103895355 A | 7/2014 |
|---|---|---|
| FR | 2199479 A1 | 4/1974 |
| JP | 01-164436 A | 6/1989 |
| WO | 2018/008758 A1 | 1/2018 |

* cited by examiner

*Primary Examiner* — Sharon Polk
(74) *Attorney, Agent, or Firm* — Global IP Counselors, LLP (57) ABSTRACT

A liquid absorber includes a plurality of small chips. Individual ones of the small chips include a first substrate containing fibers, a second substrate containing fibers, an absorbent resin supported between the first substrate and the second substrate, and an ion exchange resin supported between the first substrate and the second substrate. At least one of the absorbent resin and the ion exchange resin is exposed at an end face of the small chips.

4 Claims, 7 Drawing Sheets

LIQUID ABSORBER, LIQUID ABSORBING UNIT, AND LIQUID EJECTION APPARATUS

The present application is based on, and claims priority from JP Application Serial Number 2019-049460, filed Mar. 18, 2019 and JP Application Serial Number 2019-215068, filed Nov. 28, 2019, the disclosures of which are hereby incorporated by reference herein in their entirety.

BACKGROUND

1. Technical Field

The present disclosure relates to a liquid absorber, a liquid absorbing unit, and a liquid ejection apparatus.

2. Related Art

In general, ink jet printers discharge waste ink when cleaning the head to prevent ink clogging that is a cause of degradation of printing quality, and when filling the head with ink for changing ink cartridges. To absorb such waste ink, a liquid absorbing unit including a liquid absorber is used.

For example, International Publication No. 2018/008758 discloses an absorbent composite containing a N-vinyl lactam-based crosslinked polymer and a base material with a specific mass ratio. According to this publication, the absorbent composite is expected to be used as an excellent ink absorbent agent.

The above-cited publication describes a fact that the crosslinked structure of the N-vinyl lactam-based crosslinked polymer causes the polymer to absorb water and other solvents to swell and gel. However, this polymer is nonionic and is, therefore, not necessarily so absorbent of aqueous liquid as superabsorbent polymer (SAP), such as polyacrylic acids, having an anionic group in the main chain thereof.

Although SAP having an anionic group is absorbent of aqueous liquid, the absorption speed or the absorbency thereof is reduced when the SAP absorbs water or an aqueous solution containing ions in a large proportion. Thus, when such an anionic SAP is used to absorb, for example, a dye ink containing a high concentration of electrolyte, the absorbency of the SAP is not always as high as expected.

SUMMARY

Accordingly, the present disclosure provides a liquid absorber that is highly absorbent of dye inks in spite of using an anionic absorbent resin and also provides a liquid absorbing unit and a liquid ejection apparatus that use the liquid absorber.

A liquid absorber according to an aspect of the present disclosure includes a plurality of small chips. Individual ones of the small chips include a first substrate containing fibers, a second substrate containing fibers, an absorbent resin supported between the first substrate and the second substrate, and an ion exchange resin supported between the first substrate and the second substrate. At least one of the absorbent resin and the ion exchange resin is exposed at an end face of the small chips.

In an embodiment of the liquid absorber, the mass ratio of the ion exchange resin to the absorbent resin may be from 0.05 to 2.00.

According to another aspect of the present disclosure, a liquid absorbing unit is provided. The liquid absorbing unit includes the liquid absorber and a container containing the liquid absorber.

The present disclosure is also directed to a liquid ejection apparatus including a liquid ejection head operable to eject a liquid, and the liquid absorbing unit. The liquid absorbing unit is operable to absorb the liquid.

DESCRIPTION OF EXEMPLARY EMBODIMENTS

Some of the embodiments of the present disclosure will now be described. The following embodiments describe some implementations of the present disclosure. The implementation of the subject matter of the disclosure is not limited to the following embodiments, and various modifications may be made within the scope and spirit of the disclosure. Not all of the components disclosed in the following embodiments are necessarily essential for the subject matter disclosed herein.

1. Liquid Absorber

A liquid absorber 100 according to an embodiment of the present disclosure includes a plurality of small chips 10.

1.1. Small Chips

The small chips 10 of the liquid absorber 100 each absorb liquid. Since the chips 10 absorb liquid, the liquid absorber 100, which is a mass of the chips 10, functions to absorb liquid.

Figure 1:
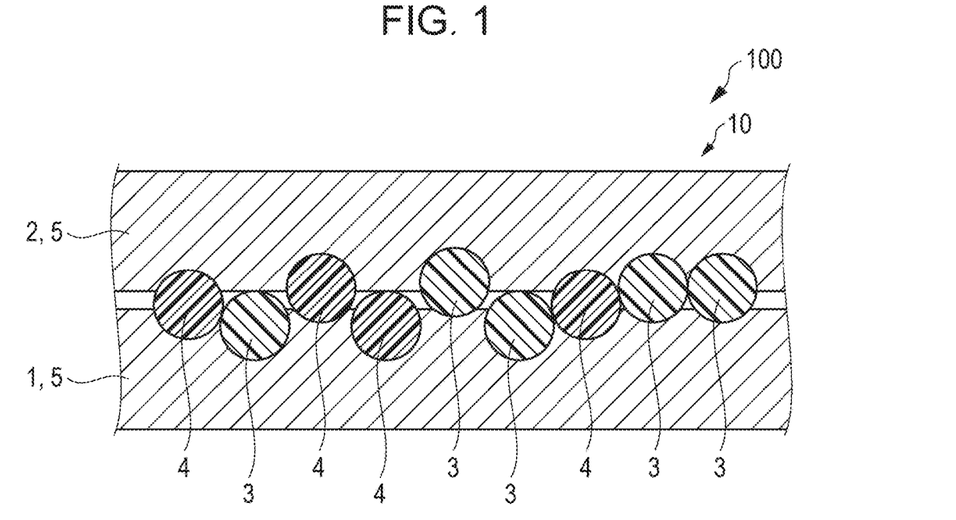
FIG. 1 is a schematic sectional view of one of small chips defining a liquid absorber according to an embodiment of the present disclosure.

FIG. 1 is a schematic sectional view of one of the chips 10 of the liquid absorber 100 of the present embodiment. Individual ones of the chips 10 include a first substrate 1, a second substrate 2, an absorbent resin 3, and an ion exchange resin 4.

1.1.1. Substrate

The first substrate 1 and the second substrate 2 are in the form of a sheet. The first substrate 1 and the second substrate 2 contain fibers. The material of fibers may be, for example, a synthetic resin, such as polyester or polyamide, or a natural fiber, such as cellulose, keratin, or fibroin.

In some embodiments, the fibers contained in the first substrate 1 and the second substrate 2 are of cellulose. Since cellulose fiber material is hydrophilic, the cellulose fibers in the substrates easily mix with and retain the liquid applied to the chip 10, thus bringing the liquid into contact with the absorbent resin 3.

Also, since cellulose fiber material has an affinity to the absorbent resin 3, the fibers in the substrates easily support the absorbent resin 3 at the surfaces thereof. In addition, since cellulose fiber material is a natural material capable of being recycled and is one of the fiber materials available at low cost, use of cellulose fiber is beneficial for manufacturing cost reduction, consistent manufacture, and environmental load reduction. The cellulose fibers used herein are fibers containing cellulose as a major component and may further contain hemicellulose and/or lignin.

The average length of the fibers may be 0.1 mm to 7.0 mm, for example, 0.1 mm to 5.0 mm or 0.1 mm to 3.0 mm. The average width of the fibers may be 0.5 μm to 200.0 μm, for example, 1.0 μm to 100.0 μm. The average aspect ratio, that is, the ratio of the average length to the average width, of the fibers may be from 10 to 1000, for example, from 15 to 500. Fibers having such dimensions are more beneficial for helping the substrates to support the absorbent resin 3, retaining liquid, and bringing the absorbent resin 3 into contact with the liquid, thus increasing the liquid absorbency of the chips 10.

The first substrate 1 and the second substrate 2 may further contain any other material in addition to the fibers. Such a material may be a binder functioning to bind fibers. The first substrate 1 and the second substrate 2 may be paper sheets including recycled waste paper, nonwoven fabric, or pulp sheets.

The first substrate 1 and the second substrate 2 may be made of the same material of different materials. In an embodiment, the first substrate 1 and the second substrate 2 may be made of the same material. Use of the same material is beneficial for easily forming the small chips 10.

1.1.2. Absorbent Resin

The absorbent resin 3 is present between the first substrate 1 and the second substrate 2. More specifically, the absorbent resin 3 is supported between the first substrate 1 and the second substrate 2. The support of the absorbent resin 3 between the first substrate 1 and the second substrate 2 may be ensured by a direct adhesion to the substrates resulting from the stickiness of the surfaces of the particles of the absorbent resin 3 or by using an adhesive or the like.

Since the absorbent resin 3 is supported between the first substrate 1 and the second substrate 2, the absorbent resin 3 does not separate or fall easily from the first substrate 1 and the second substrate 2. As depicted in FIG. 1, the particles of the absorbent resin 3 may be partially embedded in the surfaces of the first substrate 1 and the second substrate 2. In other words, the surfaces of the first substrate 1 and the second substrate 2 may be impregnated with part of the absorbent resin 3. Thus, the first substrate 1 and the second substrate 2 can more reliably support the absorbent resin 3.

The absorbent resin 3 may be a superabsorbent polymer (SAP) that can exhibit high water absorption. Water absorption is the process of water molecules being taken in. The absorbent resin 3 may absorb water to gel. More specifically, the absorbent resin 3 absorbs water from an aqueous liquid or a hydrophilic organic solvent or fluid.

Examples of the absorbent resin 3 include carboxymethyl cellulose, polyacrylic acid, polyacrylamide, starch-acrylic acid graft copolymers, hydrolysates of starch-acrylonitrile graft copolymers, vinyl acetate-acrylate copolymers, isobutylene-maleic acid copolymers, hydrolysates of acrylonitrile copolymers or acrylamide copolymers, polyethylene oxide, polysulfone compounds, polyglutamic acid, and salts, modified forms, and crosslinked forms thereof.

The absorbent resin 3 may be a nonionic SAP whose absorbency is less dependent on the electrolyte concentration of the liquid to be absorbed, for example, a crosslinked polyvinylpyrrolidone produced by Nippon Shokubai. However, such a nonionic absorbent resin is expensive, and the amount of liquid absorption per weight thereof is as low as about 1/5 to 1/20 of that of generally used anionic SAP having an acid group. Accordingly, in some embodiments, the absorbent resin may contain an anionic SAP without being composed of only nonionic SAPs.

Accordingly, in some embodiments, a resin having an acid group may be used as the absorbent resin 3. The acid group may be the carboxy group, the sulfo group, or the phosphate group. Resins having a carboxy group are easily available and are therefore beneficial.

The carboxy group of such a resin may be present on a side chain of the resin molecule. Resins having a carboxy group on a side chain may be produced from monomer units, such as acrylic acid, methacrylic acid, itaconic acid, maleic acid, crotonic acid, fumaric acid, sorbic acid, cinnamic acid, and anhydrides, salts, and other derivatives thereof. In some embodiments, the absorbent resin 3 may have such a monomer unit.

An absorbent resin 3 having an acid group may be neutralized to form a salt, and the proportion of the acid group in the form of a salt may be, by mole, 30% to 100%, for example, 50% to 95%, 60% to 90%, or 70% to 80%. Such an absorbent resin 3 exhibits high water absorption. In this instance, the salt formed by the neutralization may be a salt of an alkali metal, such as sodium, potassium, or lithium or a salt of a nitrogen-containing base, such as ammonia. Sodium salts are beneficial.

In some embodiments, the absorbent resin 3 contains a poly(meth)acrylic acid salt copolymer or a crosslinked poly(meth)acrylic acid polymer. In the poly(meth)acrylic acid salt copolymer or the crosslinked poly(meth)acrylic acid polymer, the monomer unit having a carboxy group may account for 50% by mole or more of all the structural units of the molecular chain of the polymer. For example, such a monomer unit may account for 80% by mole or more or 90% by mole or more.

The absorbent resin 3 may be in the form of, for example, scaly particles, needle-like particles, fibers, spherical particles, or particles having any other shape. In some embodiments, spherical particles account for the majority of the absorbent resin 3. An absorbent resin 3 in the form of spherical particles allows easy water permeation. In addition, spherical particles are more likely to be supported by the fibers in the first substrate 1 and the second substrate 2. The term "spherical particles" used herein refers to particles of which the aspect ratio (ratio of the smallest length to the largest length) is in the range of 0.3 to 1.0. The average particles size of the absorbent resin particles may be 15 μm to 800 μm, for example, 15 μm to 400 μm or 15 μm to 50 μm.

The particle size may be represented by a mean volume diameter (MVD) measured by, for example, a laser diffraction particle size distribution analyzer, which is a particle size distribution analyzer based on a laser diffraction/scattering method and can measure particle size distribution on a volume basis.

The absorbent resin 3 may satisfy $0.15 \leq L/D \leq 467$, for example, $0.25 \leq L/D \leq 333$ or $2 \leq L/D \leq 200$, wherein D represents the average particle size of the absorbent resin 3 and L represents the average length of the fibers in the first substrate 1 and the second substrate 2. The average particle size of the absorbent resin 3 may be adjusted by a known pulverization or grinding method if necessary.

The proportion of the absorbent resin content in the small chip 10 may be, by mass, 25% to 300%, for example, 50% to 150%, relative to the fiber content. Such chips 10 ensure sufficient liquid absorption and permeation.

Some resins suitable as the absorbent resin 3 of the small chips 10 disclosed herein are commercially available, and examples thereof include AQUALIC CA series and AQUALIC CS series produced by Nippon Shokubai, SANWET series and SANFRESH ST-500MPSA and other SANFRESH series produced by Sanyo Chemical Industries, Hysorb series produced by BASF, FAVOR series produced by Evonik, and AQUASORB series produced by SNF.

1.1.3. Ion Exchange Resin

The ion exchange resin 4 is present between the first substrate 1 and the second substrate 2. More specifically, the ion exchange resin 4 is supported between the first substrate 1 and the second substrate 2. The support of the ion exchange resin 4 between the first substrate 1 and the second substrate 2 may be ensured by a direct adhesion to the substrates resulting from the stickiness of the surfaces of the particles of the ion exchange resin 4, or by an adhesion resulting from the stickiness of the absorbent resin 3 or produced by using an adhesive or the like.

Since the ion exchange resin 4 is supported between the first substrate 1 and the second substrate 2, the ion exchange resin 4 does not separate or fall easily from the first substrate 1 and the second substrate 2. As depicted in FIG. 1, the particles of the ion exchange resin 4 may be partially embedded in the surfaces of the first substrate 1 and the second substrate 2. Thus, the first substrate 1 and the second substrate 2 can more reliably support the ion exchange resin 4.

Ion exchange resins include cation exchange resins capable of trapping cations and anion exchange resins capable of trapping anions. The chip 10 includes at least one of a cation exchange resin and an anion exchange resin.

A cation exchange resin functions to trap cations from a liquid and releases hydrogen ions. For example, a cation exchange resin in contact with an aqueous solution traps cations from the solution and releases an amount of hydrogen ions equivalent to the amount of the trapped cations. The released hydrogen ions cause a neutralization reaction with hydroxide ions in the solution to produce water.

Thus, such a cation exchange resin can be used to remove cations, such as metal ions and ammonium ions. Such a cation exchange resin may be referred to as an "H-form type" in some cases.

Cation exchange resins can be classified into two types depending on the acidity of the functional group of the resin: one is the type of strongly acidic cation exchange resins; and the other is the type of weakly acidic cation exchange resins. In the embodiments of the present disclosure, either type may be used. In some embodiments, a strongly acidic cation exchange resin may be used in view of cation exchanging efficiency.

The cation exchange resin used herein may be in the form of a porous solid or a gel. Gel-type cation exchange resins are more versatile and less expensive than the porous solid type. The cation exchange resin may be in the form of scaly particles, needle-like particles, fibers, spherical particles, or particles having any other shape. In some embodiments, spherical particles may account for the majority of the cation exchange resin. Spherical particles of the cation exchange resin are likely to help the fibers in the first substrate 1 and the second substrate 2 to support the absorbent resin 3.

The cation exchange resin used herein may satisfy $0.15 \leq L/D \leq 467$, for example, $0.25 \leq L/D \leq 333$ or $2 \leq L/D \leq 200$, wherein D represents the average particle size of the cation exchange resin particles and L represents the average length of the fibers in the first substrate 1 and the second substrate 2. The average particle size of the cation exchange resin may be adjusted by a known pulverization or grinding method if necessary.

The proportion of the cation exchange resin content in the small chip 10 may be, by mass, 25.0% to 300.0%, for example, 50.0% to 150.0%, relative to the fiber content. Thus, the chips 10 ensure sufficient absorption and penetration of dye inks.

The cation exchange resin is commercially available, and examples thereof include IXE-100 and some other IXE series produced by Toagosei; Amberlite series IR120B, IR124, FPC3500, and IPC76 and Amberlyst series 15DRY, 15JWET, 16WET, 31WET, and 35WET, all available from Organo; gel-type DIAION series (H-form type) SK104 and SK1B and porous DIAION series (H-form type) PK212, PK216, and PK228, all produced by Mitsubishi Chemical; Solid Super Strong Acid (sulfated zirconia ($SO_4/ZrO_2$)) produced by FUJIFILM Wako Pure Chemical Corporation; and Carbon Type Solid Acid Catalyst produced by GS Alliance.

An anion exchange resin functions to trap anions from a liquid and release hydroxide ions. For example, an anion exchange resin in contact with an aqueous solution traps anions from the solution and releases an amount of hydroxide ions equivalent to the amount of the trapped anions. The released hydroxide ions cause a neutralization reaction with hydrogen ions in the solution to produce water. Such an anion exchange resin may be referred to as an "OH-form type" in some cases.

Such an anion exchange resin can be used to remove anions having a relatively low molecular weight, for examples, anions produced by ionization of acetic acid, sulfuric acid, sodium chloride, or the like, or anions having a relatively high molecular weight, for example, anions produced by ionization of dye, protein, nucleic acid, or the like.

Anion exchange resins can be classified into two types depending on the basicity of the functional group of the resin: one is the type of strongly basic anion exchange resins; and the other is the type of weakly basic anion exchange resins. The anion exchange resin used herein may be in the form of a porous solid or a gel. Gel-type anion exchange resins are more versatile and less expensive than the porous solid type. The anion exchange resin may be in the form of scaly particles, needle-like particles, fibers, spherical particles, or particles having any other shape. In some embodiments, spherical particles may account for the majority of the anion exchange resin. Spherical particles are more favorably supported by the fibers in the substrate.

The anion exchange resin used herein may satisfy $0.15 \leq L/D \leq 467$, for example, $0.25 \leq L/D \leq 333$ or $2 \leq L/D \leq 200$, wherein D represents the average particle size of the anion exchange resin particles and L represents the average length of the fibers in the first substrate 1 and the second substrate 2. The average particle size of the anion exchange resin may be adjusted by a known pulverization or grinding method if necessary.

The anion exchange resin is commercially available, and examples thereof include IXE-500, IXE-530, IXE-550, IXE-700F, IXE-700D, IXE-800, and some other IXE series produced by Toagosei; Amberlite series IRA400J OH, IRA402BL OH, IRA404J OH, IRA900J OH, IRA904 OH, IRA458RF OH, IRA958 OH, and IRA900J OH, all available from Organo; and gel-type DIAION SA10A (Type I, OH-form type) produced by Mitsubishi Chemical.

The ion exchange resin used herein may be in the form of, for example, scaly particles, needle-like particles, fibers, spherical particles, or particles having any other shape. In some embodiments, spherical particles account for the majority of the ion exchange resin. Ion exchange resins in the form of spherical particles allow easy water permeation. In addition, spherical particles are more likely to be supported by the fibers in the first substrate 1 and the second substrate 2. The term "spherical particles" used herein refers to particles of which the aspect ratio (ratio of the smallest length to the largest length) is in the range of 0.3 to 1.0. The average particle size of the ion exchange resin particles may be 0.15 µm to 800.0 µm, for example, 15.0 µm to 400.0 µm or 15.0 µm to 50.0 µm.

The particle size may be represented by a mean volume diameter (MVD) measured by, for example, a laser diffraction particle size distribution analyzer, which is a particle size distribution analyzer based on a laser diffraction/scattering method and can measure particle size distribution on a volume basis.

The proportion of the ion exchange resin 4 content in the small chip 10 may be, by mass, 2.5% to 300.0%, for example, 50.0% to 150.0%, relative to the fiber content. Thus, the chips 10 ensure sufficient absorption and penetration of dye inks.

1.1.4. Proportion of Ion Exchange Resin to Absorbent Resin in Small Chip

The chips 10 can function effectively when the mass ratio (mass of ion exchange resin 4/mass of absorbent resin 3) of the ion exchange resin 4 to the absorbent resin 3 is from 0.03 to 3.00. In some embodiment, the mass ratio of the ion exchange resin 4 to the absorbent resin 3 may be from 0.05 to 2.00 or from 0.10 to 1.50. Such chips 10 can rapidly absorb dye inks or other liquid having a high electrolyte concentration. The liquid absorber 100 composed substantially of the chips 10 also has the same mass ratio of the ion exchange resin 4 to the absorbent resin.

1.1.5. Shape of Small Chips

Figure 2:
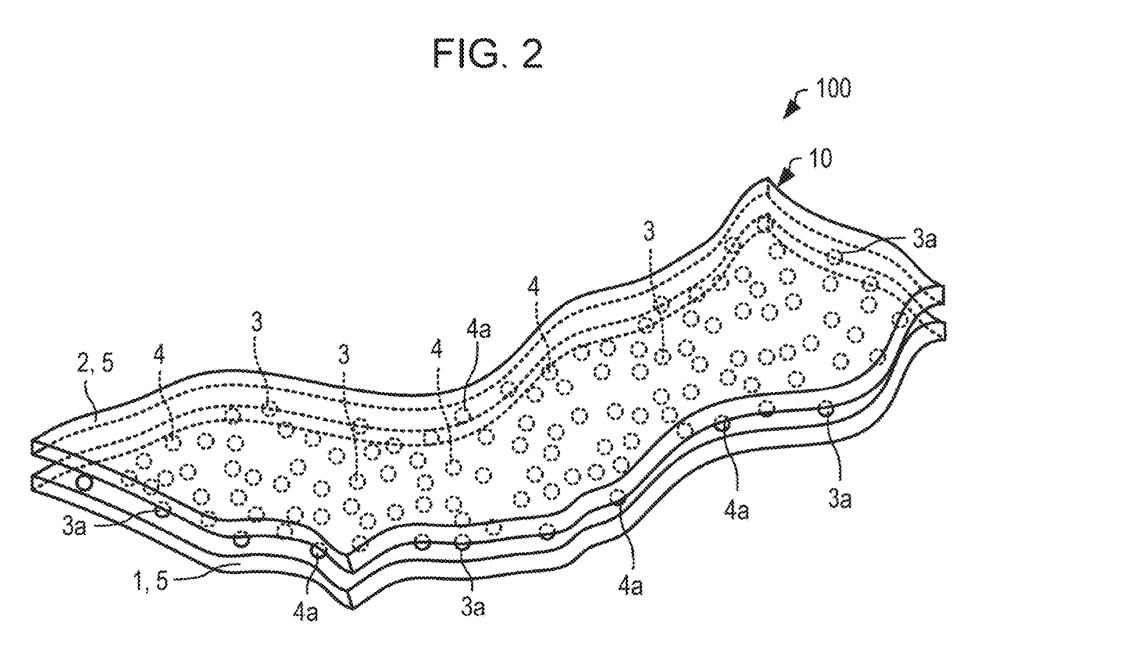
FIG. 2 is a schematic perspective view of one of the small chips of a liquid absorber according to an embodiment of the present disclosure.

FIG. 2 is a schematic perspective view of one of the small chips 10 of the liquid absorber according to an embodiment of the present disclosure. The chips 10 are pieces formed by cutting with a shredder or the like a structure including a sheet member 5 for the first substrate 1 and the second substrate 2, and the absorbent resin 3 and the ion exchange resin 4 sandwiched and supported in the sheet member. FIG. 1 used for the description above schematically illustrates a part of a chip 10. The chip 10 may be flexible and rectangular. Such a chip 10 can easily change the shape thereof and is accordingly easy to handle, for example, when housed in a container.

The length, or the measurement in the longitudinal direction, of the chip 10 may be 0.5 mm to 200.0 mm, for example, 1.0 mm to 100.0 mm or 2.0 mm to 30.0 mm.

The width, or the measurement along the shorter side, of the chip 10 may be 0.1 mm to 100.0 mm, for example, 0.3 mm to 50.0 mm or 1.0 mm to 10.0 mm.

The aspect ratio, that is, the ratio of the length to the width, of the chip 10 may be from 1 to 200, for example, from 1 to 30. The thickness of the chip 10 may be 0.05 mm to 2.0 mm, for example, 0.1 mm to 1.0 mm.

The chip 10 having such dimensions is more beneficial for supporting the absorbent resin 3 and the ion exchange resin 4, helping the fibers to retain liquid, and bringing the liquid into contact with the absorbent resin 3, thus exhibiting high liquid absorption.

1.1.6. Position of Absorbent Resin and Ion Exchange Resin in Small Chip

At least one of the absorbent resin 3 and the ion exchange resin 4 is exposed at an end face of the chip 10. The first substrate 1 and the second substrate 2 of the chip 10 are not in close contact and have a gap therebetween. When the gap is viewed in a direction parallel to the substrates or the sheet member, at least one of the absorbent resin 3 and the ion exchange resin 4 is seen. In the description disclosed herein, the state where at least one of the absorbent resin 3 and the ion exchange resin 4 is seen at an end face of the chip 10 is represented as "exposed at an end face of the chip 10".

In FIG. 2, for example, when an end face of the chip 10 is viewed in a direction parallel to the substrates (sheet member 5), absorbent resin particles denoted by numeral 3a of the absorbent resin 3 and ion exchange resin particles denoted by numeral 4a of the ion exchange resin 4 are seen. The absorbent resin 3 and the ion exchange resin 4 in such a state can be represented to be exposed at an end face.

The end face at which at least one of the absorbent resin 3 and the ion exchange resin 4 is exposed is at least one of the sides or a part of the periphery of the chip 10 when viewed from above and may be the entire periphery or all the end faces.

At least one of the absorbent resin 3 and the ion exchange resin 4 can be exposed at an end face of the chip 10 by cutting, grinding, or tearing a structure containing the absorbent resin 3 and the ion exchange resin 4 between the first substrate 1 and the second substrate 2 into pieces with scissors, a cutter, a mill, a shredder, or the like or by hand.

When at least one of the absorbent resin 3 and the ion exchange resin 4 is exposed at an end face of the chip 10, the liquid applied to the chip 10 comes directly into contact with either the absorbent resin 3 or the ion exchange resin 4 or both. Thus, the chip 10 exhibits high absorption of the liquid. When the ion exchange resin 4 is exposed at an end face of the chip 10, the ion exchange resin 4 comes into contact with liquid before the absorbent resin 3. In this instance, the absorbent resin 3 then comes into contact with the liquid having a reduced ion concentration. Thus, the absorbency of the chip 10 can be further increased.

1.1.7. Function and Effect of the Chip

The chip 10 absorbs liquid. As described above, the chip 10 disclosed herein includes an absorbent resin 3, and the absorbent resin 3 is sandwiched between the substrate 1 and the second substrate 2. In addition, at least one of the absorbent resin 3 and the ion exchange resin 4 is exposed at an end face of the chip 10. Such a structure of the chip may be hereinafter referred to as an "exposed sandwich structure". Accordingly, when the chip 10 comes into contact with a liquid, the liquid is subjected to absorption by the first substrate 1 or the second substrate 2, absorption by the absorbent resin 3, and ion trapping by the ion exchange resin 4.

If a highly absorbent resin having an acid group is used as the absorbent resin 3, the absorbent resin 3 releases cations counter to the acid group, such as sodium ions, potassium ions, lithium ions, or ammonium ions when absorbing a liquid. Such an absorbent resin 3 having an acid group may be degraded in terms of the degree and speed of absorption when the ion concentration in the liquid to be absorbed is increased. In some cases, such an absorbent resin 3 increases the ion concentration in a liquid while absorbing the liquid, thus reducing the absorbency by itself.

For example, when a liquid having a high electrolyte concentration, such as a dye ink, is absorbed by an SAP, the SAP itself releases ions (typically cations), and the ions hinder the absorption by the SAP. Therefore, even if the amount of SAP is increased, the liquid absorption is not so increased as the increase of the SAP. When an anionic SAP is used, autogenous shrinkage of the SAP may occur due to a concentration of cations released from the SAP.

The chip 10 disclosed herein has a sandwich structure in which the ion exchange resin 4 is sandwiched. In this structure, the ion exchange resin 4 can trap ions released from the absorbent resin 3 absorbing an aqueous solution. Thus, the decrease in the absorbency of the absorbent resin 3 is suppressed, and the absorbency of the absorbent resin 3 is maintained.

Furthermore, since the chip 10 disclosed herein has a sandwich structure, the spatial distance between the absorbent resin 3 and the ion exchange resin 4 is small; hence, the two resins are close to each other. Accordingly, the ion exchange resin 4 can efficiently trap ions released from the absorbent resin 3, thus suppressing the decrease in the absorbency of the absorbent resin 3 effectively.

Also, the sandwich structure of the chip 10 hinders the diffusion of molecules of the liquid that has entered between the first substrate 1 and the second substrate 2. Accordingly, the presence of the ion exchange resin 4 close to the absorbent resin 3 is considered to be much effective.

In addition, the degree and speed of absorption by the absorbent resin 3 may be reduced not only when the absorbent resin 3 itself releases ions but also when the liquid to be absorbed has a high ion concentration. The ion exchange resin 4 can trap ions from such a liquid and, accordingly, can suppress the decrease in the degree and speed of absorption by the absorbent resin 3.

The liquid absorbed by the chip 10 may be, but is not limited to, aqueous liquid. The chip 10 is absorbent even of liquid with a high electrolyte concentration because of the above-described structure. Accordingly, the chip 10 is particularly effective in absorbing liquid with a high ion concentration, such as a dye ink.

In general, inks are classified into three types: pigment inks, dye inks, and mixtures thereof. The coloring materials contained in different types of ink are different, and pigment inks have a low electrolyte concentration, while dye inks have a high electrolyte concentration. Accordingly, SAPs are more absorbent of pigment inks but less absorbent of dye inks.

1.2. Liquid Absorber

Figure 3:
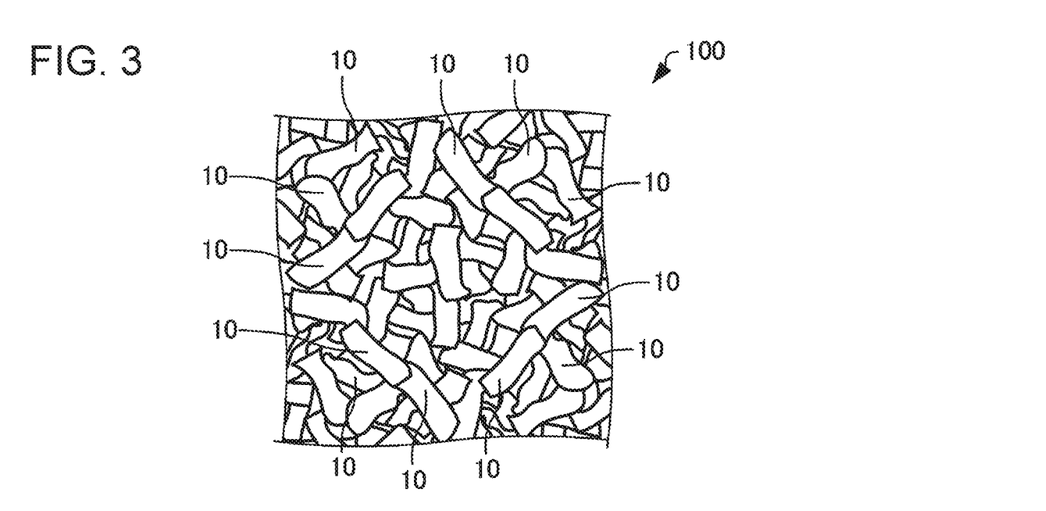
FIG. 3 is an illustrative representation of a liquid absorber according to an embodiment of the present disclosure.

FIG. 3 is an illustrative representation of a liquid absorber 100 according to an embodiment of the present disclosure. As depicted in FIG. 3, the liquid absorber 100 includes the small chips 10 described above. In other words, the liquid absorber 100 is a mass of the small chips 10. The number of chips 10 in the liquid absorber 100 may be, but is not limited to, 100 or more, for example, 200 or more or 500 or more.

In the liquid absorber 100, the chips 10 may be the same in terms of least one of the length, the width, the aspect ratio, and the thickness, or at least some of the chips 10 may be different in all of those measurements.

In some embodiments, the chips 10 of the liquid absorber 100 have a regular shape. Such a liquid absorber 100 is likely to have a constant bulk density, exhibiting uniform liquid absorption. The content of chips 10 having a regular shape in the liquid absorber 100 may be 30% or more, for example, 50% or more or 70% or more, relative to the total mass of the liquid absorber 100.

The chips 10 of the liquid absorber 100 may be randomly present intersecting each other in a three-dimensional manner without a regular orientation. Thus, gaps are likely to be formed among the chips 10. The gaps among the chips 10 allow the liquid to pass through. In addition, thin gaps cause a capillary action to ensure liquid permeation. For example, a liquid absorber 100 housed in a container allows a liquid to flow downward in the container without stopping the flow and penetrate through the liquid absorber to the bottom of the container.

In addition, since the small chips 10 are three-dimensionally randomly housed in a container, the opportunity of the liquid absorber 100 to come in contact with liquid increases as a whole, and, accordingly, the liquid absorber 100 can exhibit satisfactory liquid absorption. Also, the chips 10 can be randomly placed into a container when the liquid absorber 100 is housed in the container. The liquid absorber 100 thus allows easy and rapid work. The chips 10 are flexible. The liquid absorber 100 that is a mass of flexible chips 10 can be readily housed in a container, following the shape of the container, irrespective of the shape of the container.

The bulk density of the liquid absorber 100 may be 0.01 $g/cm^3$ to 0.5 $g/cm^3$, for example, 0.03 $g/cm^3$ to 0.3 $g/cm^3$ or 0.05 $g/cm^3$ to 0.2 $g/cm^3$. Such a liquid absorber 3 ensures both liquid absorption and liquid permeation.

The liquid absorber 100 may contain other constituents. Examples of such constituents include a surfactant, a lubricant, an antifoaming agent, a filler, an anti-blocking agent, a UV absorber, a coloring agent, such as a pigment or a dye, active carbon, a flame retardant, and a fluidity improver.

The liquid absorber 100, in which the chips 10 have the above-described structure and effects, is highly absorbent even of a liquid having a cation concentration. Accordingly, the liquid absorber 100 are particularly effective in absorbing liquid with a high cation concentration, such as a dye ink.

1.3. Manufacture of Liquid Absorber

A process for manufacturing the liquid absorber 100 according to an embodiment of the present disclosure will now be described with reference to some of the drawings. FIGS. 4 to 7 are illustrative representations of a process for forming small chips 10 of the liquid absorber 100.

Figure 4:
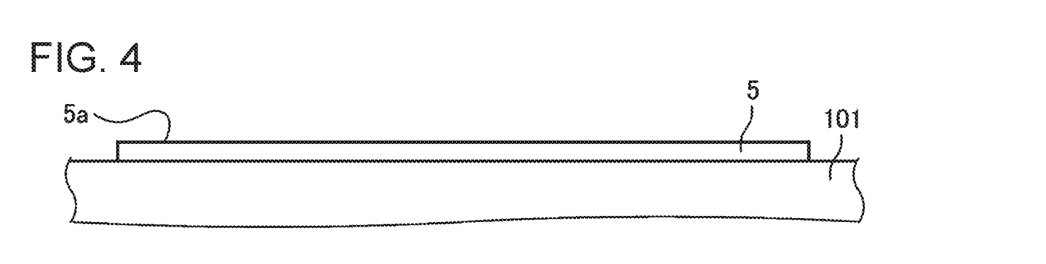
FIG. 4 is an illustrative representation of the process for forming small chips of a liquid absorber.

A sheet member 5 (for example, a recycled waste-paper sheet) that will act as the first substrate 1 and the second substrate 2 is placed on a table 101, as depicted in FIG. 4. Then, a liquid containing water, for example, pure water, is applied onto a surface of the sheet member 5 by spray coating or by rolling a spongy roller soaked with the liquid containing water over the surface of the sheet member.

Figure 5:
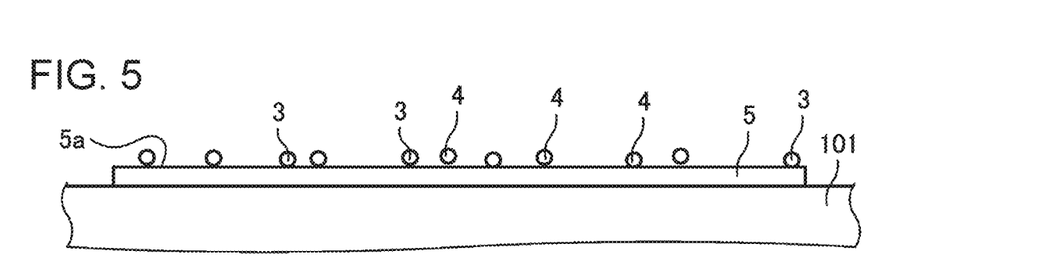
FIG. 5 is an illustrative representation of the process for forming small chips of a liquid absorber.

Then, as depicted in FIG. 5, an absorbent resin 3 and an ion exchange resin 4 are applied onto a surface 5a of the sheet member 5. This application can be performed by dispersing the absorbent resin 3 and the ion exchange resin 4 over the surface 5a of the sheet member 5 optionally through a mesh or the like. The absorbent resin 3 and the ion exchange resin 4 may be applied simultaneously or one after the other.

Figure 6:
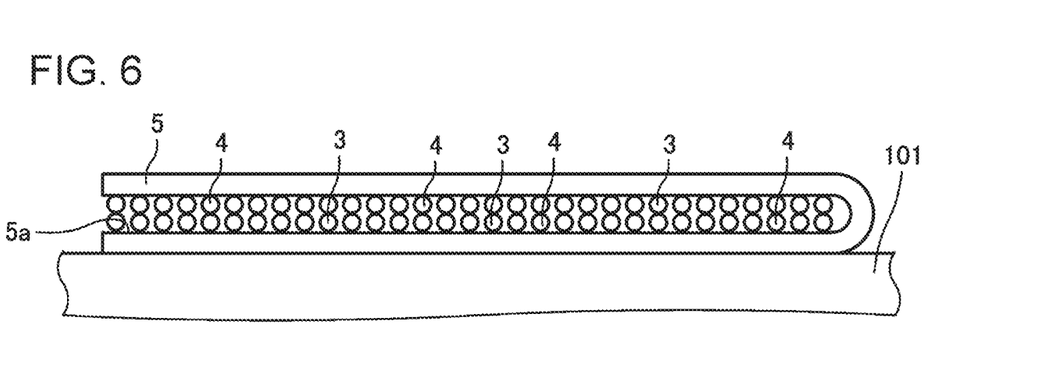
FIG. 6 is an illustrative representation of the process for forming small chips of a liquid absorber.

After the absorbent resin 3 and the ion exchange resin 4 are dispersed, the sheet member 5 on the table 101 is folded in two in such a manner that the surface 5a having the absorbent resin 3 and the ion exchange resin 4 thereon comes inside, as depicted in FIG. 6.

Figure 7:
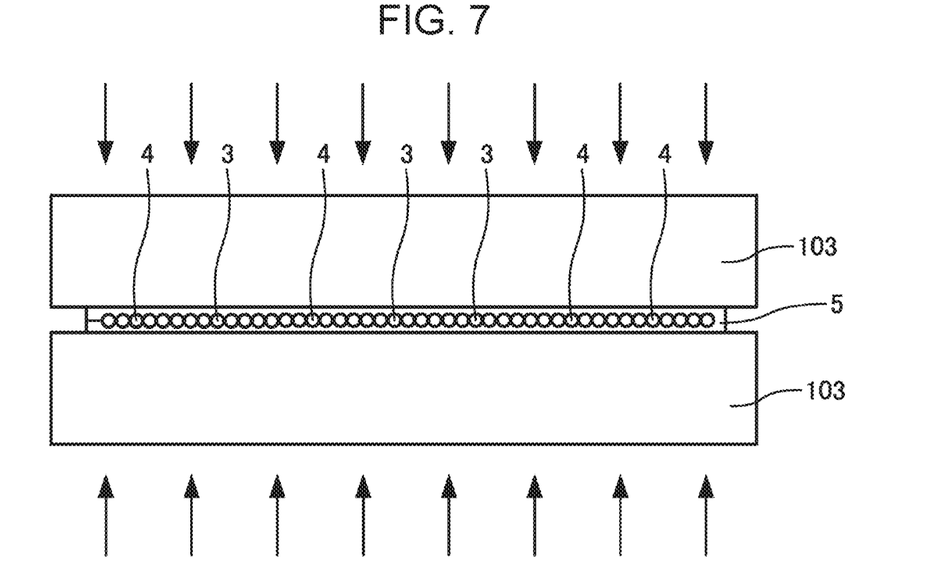
FIG. 7 is an illustrative representation of the process for forming small chips of a liquid absorber.

As depicted in FIG. 7, the folded sheet member 5 is disposed between a pair of heating blocks 103. While being heated, the heating blocks 103 are moved toward the sheet member 5 in the opposite directions to press the sheet member 5 in the thickness direction. Thus, the absorbent resin 3 and the ion exchange resin 4 are heated to soften, and the particles thereof are embedded in the sheet member 5 by the pressing. Also, some particles of the softened absorbent resin 3 may join to other particles thereon between the opposing portions of the folded sheet member 5.

The pressure to press the sheet member 5 may be 0.1 $kg/cm^2$ to 1.0 $kg/cm^2$, for example, 0.2 $kg/cm^2$ to 0.8 $kg/cm^2$. The heating temperature in this operation may be 80.0° C. to 160.0° C., for example, 100.0° C. to 120.0° C.

When heat and pressure are removed, temperature decreases, and the embedded particles of the absorbent resin 3 and the ion exchange resin 4 are joined to the sheet member 5 and further join the opposing portions of the folded sheet member 5 together. In an embodiment, an adhesive may be used to enhance the adhesion between the opposing portions of the sheet member 5.

Then, the sheet member 5 is cut, ground, or tore into a plurality of small chips 10 with scissors, a cutter, a mill, a shredder, or the like or by hand. The opposing portions of the folded sheet member 5 act as the first substrate 1 and the second substrate 2 of the small chip 10. The resulting chips 10 define the liquid absorber 100. After a desired amount of the liquid absorber 100 is weighed out, the chips 10 may be disentangled by hand to adjust the bulk density or the shape of the liquid absorber 100.

1.4. Modification of Liquid Absorber

The liquid absorber disclosed herein may contain both a cation exchange resin and an anion exchange resin as the ion exchange resin. If the liquid absorber contains both a cation exchange resin and an anion exchange resin, both may be supported between the first substrate and the second substrate, or either of them may be supported at the surface of the chips or present in an unsupported powder state.

Also, if the liquid absorber contains both a cation exchange resin and an anion exchange resin, it is beneficial that the anion exchange resin be supported at the surfaces of the chips and/or present in an unsupported powder state without being supported between the first substrate and the second substrate.

Figure 8:
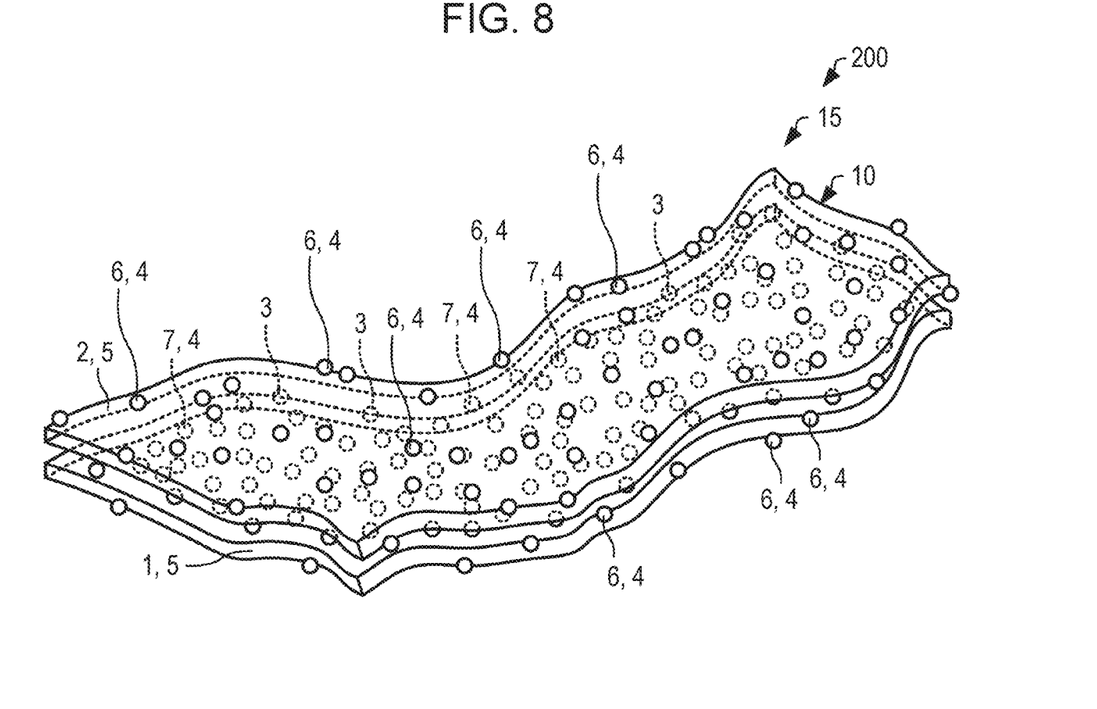
FIG. 8 is a schematic perspective view illustrating the shape of a small chip of a modification of the liquid absorber.

FIG. 8 is a schematic perspective view of a chip 15 of a liquid absorber 200 of a modification. The liquid absorber 200 contains both a cation exchange resin 7 (4) and an anion exchange resin 6 (4). The chip 15 is the above-described chip 10 at the surface of which the anion exchange resin 6 (4) is supported. The chip 15 is in a state where the anion exchange resin 6 is supported at the outer surface of the chip 10 in which the cation exchange resin 7 as the ion exchange resin 4 and an absorbent resin 3 are supported between the first substrate 1 and the second substrate 2. In this modification, also, at least one of the absorbent resin 3 and the ion exchange resin 4 (cation exchange resin 7) is exposed at an end face of the chip.

As depicted in FIG. 8, the anion exchange resin 6 is supported at the ouster surfaces of the first substrate 1 and the second substrate 2. In this instance, the anion exchange resin 6 may be supported by attachment to the surfaces of the first substrate 1 and the second substrate 2, partial embedment of the particles thereof to the surfaces, or adhesion with an adhesive. The particles of the anion exchange resin 6 in such states may coexist.

Anion exchange resins cited above can be used as such an anion exchange resin 6. The anion exchange resin 6 may be in the form of scaly particles, needle-like particles, fibers, spherical particles, or particles having any other shape. Spherical particles may account for the majority of the anion exchange resin. Spherical particles are more favorably supported by the fibers in the substrate.

In the present modification, the chip 15 of the liquid absorber 200 may be produced by spraying or sprinkling a dispersion liquid of the ion exchange resin 6 onto a chip 10. Hence, the liquid absorber 200 including a plurality of chips 15 may be obtained by spraying (or sprinkling) a dispersion liquid of the ion exchange resin 6 onto the above-described liquid absorber 100. Thus, the ion exchange resin 6 is supported at the surfaces of the chips 10. The dispersion liquid may contain an adhesive. Use of such a dispersion liquid causes the particles of the anion exchange resin 6 to adhere to the substrates, thus preventing the anion exchange resin 6 from falling from the chips 15.

As described above, the absorbency of an absorbent resin 3 decreases when the cation concentration around the absorbent resin 3 increases. However, the absorbency of the absorbent resin 3 decreases under the condition where the ion concentration (electrolyte concentration) around the absorbent resin 3, that is, the concentration of ions including anions as well as cations, is high. More specifically, the absorbency of the absorbent resin 3 is reduced by the anionic group of the absorbent resin itself undergoing an interference from surroundings when the anion concentration around the absorbent resin 3 is high.

In the liquid absorber 200 of the modification, however, the anion exchange resin 6 is not held between the first substrate 1 and the second substrate 2 of the chips 10. When a liquid is applied to the liquid absorber 200, the anion exchange resin 6, therefore, comes into contact with the liquid before the chips 10 comes into contact. Thus, the anion exchange resin 6 traps anions from the liquid to reduce the anion concentration of the liquid and thus allows the liquid having a lower anion concentration to come to the chips 10. Consequently, the absorbent resin 3 reduces anions therearound and, thus, exhibits a higher absorption of the liquid.

The liquid absorber 200 of the modification, as well as the foregoing absorbent liquid 100 having above-described functions and effects, can produce a particularly outstanding effect on liquids with a high ion concentration, such as a dye ink. An example of the liquid absorber 200 of the modification will now be described in which a dye ink is applied thereto.

As the dye ink comes into contact with the anion exchange resin 6, the anion exchange resin 6 traps anions (for example, ionized dye molecules). Also, the contact of the dye ink with the anion exchange resin 6 causes anions to aggregate. The trapped anions are unlikely to enter the chips, and the aggregated anions (aggregate of dye molecules) undergo the filtration effect of the substrates of the individual chips 10 or the like and are unlikely to enter the chips 10. Thus, the dye ink of which the anion concentration is reduced reaches the absorbent resin 3 sandwiched between the substrates of the chips 10. The absorbent resin 3 can exhibit satisfactory absorption, so that the liquid absorber 200 can exhibit sufficient absorption accordingly.

The chips 15 of the modification may be formed in the same manner as the foregoing chips 10 by, for example, applying a predetermined ion exchange resin 4 onto a sheet member 5 in which an absorbent resin 3 and a cation exchange resin 7 are sandwiched, before or after cutting the sheet member 5 into small chips with a shredder or the like.

For applying the ion exchange resin 4, for example, a dispersion liquid of the ion exchange resin 4 may be sprayed with a dispenser, and the applied ion exchange resin is fixed to the surface of the sheet member or the surfaces of the chips by hot-air drying. The dispersion medium for the ion exchange resin may be water or an organic solvent. If water is used, a surfactant may be added to sufficiently disperse the resin. The surfactant in this instance may be a nonionic surfactant, such as an ether, an ester, or an amide.

2. Liquid Absorbing Unit

Figure 9:
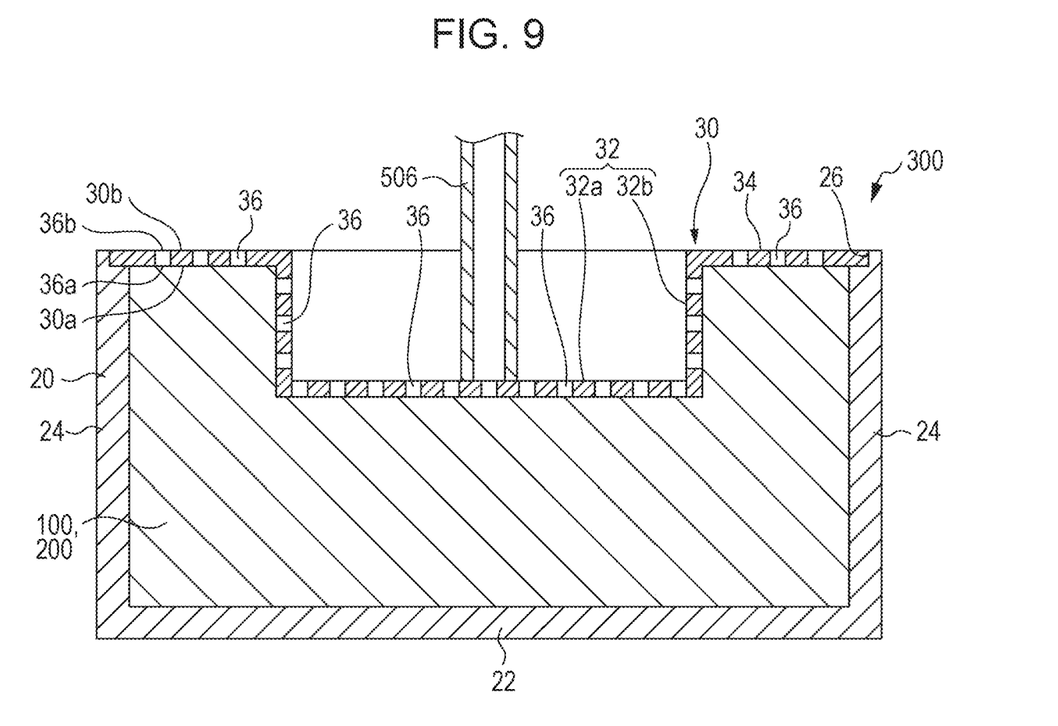
FIG. 9 is a schematic sectional view of a liquid absorbing unit according to an embodiment of the present disclosure.
Figure 10:
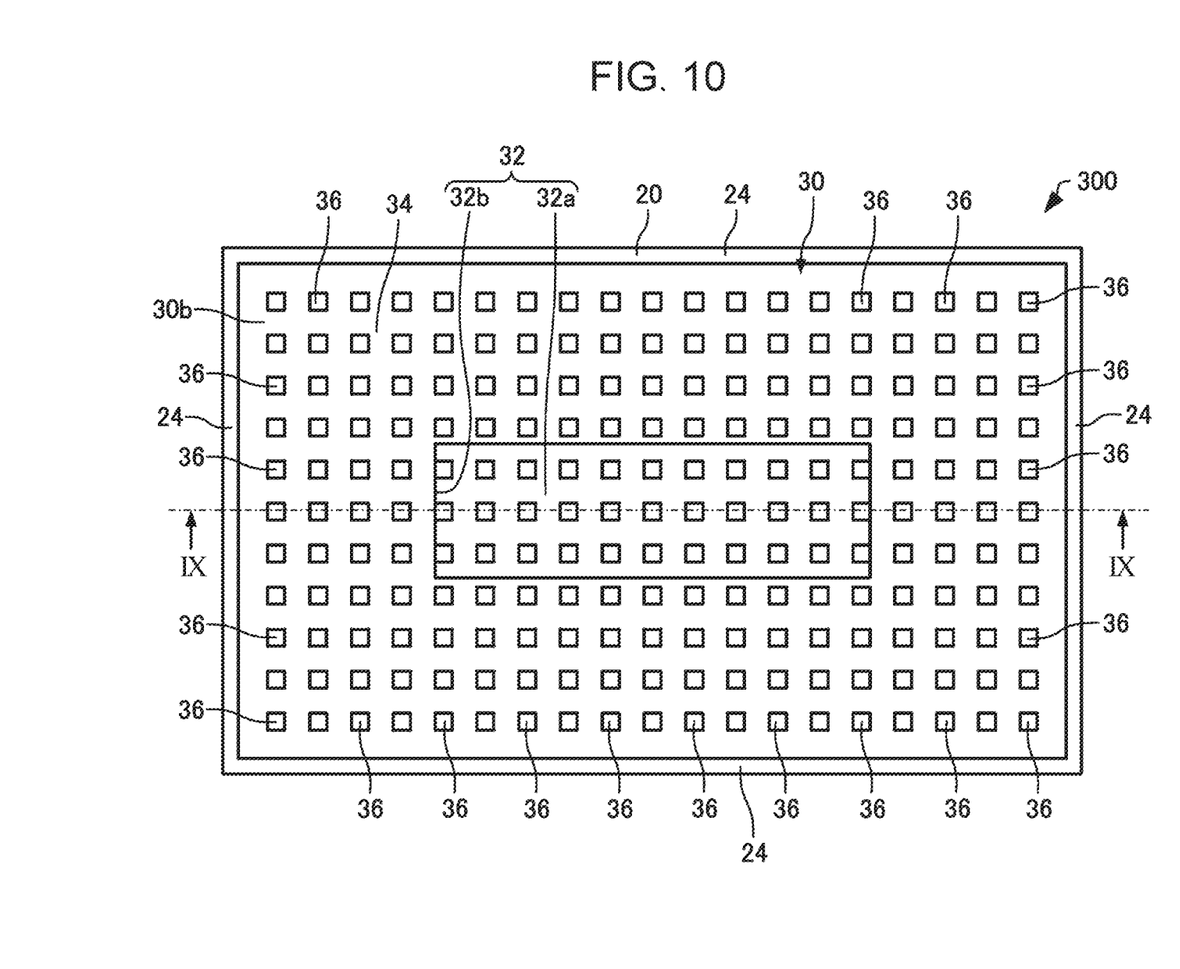
FIG. 10 is a schematic plan view of a liquid absorbing unit according to an embodiment of the present disclosure.

A liquid absorbing unit according to an embodiment of the present disclosure will now be described with reference to some of the drawings. FIG. 9 is a schematic sectional view of a liquid absorbing unit 300 according to an embodiment of the present disclosure. FIG. 10 is a schematic plan view of the liquid absorbing unit 300. FIG. 9 illustrates the section taken along line IX-IX in FIG. 10.

As depicted in FIGS. 9 and 10, the liquid absorbing unit 300 includes a liquid absorber 100 or 200, a case 20 or container, and a lid 30. In FIGS. 9 and 10, the liquid absorber 100 or 200 is simplified for the sake of convenience. Reference numeral 506 designates a tube, which is omitted in FIG. 10. The components of the liquid absorbing unit will now be described.

2.1. Case

The case 20 is a container in which the liquid absorber 100 or 200 is housed. As depicted in FIG. 9, the case 20 contains the liquid absorber 100 or 200. For example, the case 20 has a rectangular planar bottom 22 and four sidewalls 24 along each side of the bottom 22. The upper end of the case 20 is open. The shape of the bottom 22 is not necessarily rectangular and may be, for example, circular.

The ratio V2/V1 of the volume V2 of the liquid absorber 100 or 200 before absorbing a liquid to the capacity V1 of the case 20 may be from 0.1 to 0.7, for example, from 0.2 to 0.7.

In some embodiments, the case 20 can maintain the shape or dimensions to the extent that the capacity V1 does not 10% or more vary even if an inner pressure occurs or an external force is applied to the case 20. Such a case 20 maintains the shape thereof even if the case 20 undergoes a force from the liquid absorber 100 or 200 swollen by absorbing a liquid, such as ink. Thus, the case 20 is stable in an installed state, thus allowing the liquid absorber 100 or 200 to consistently absorb a liquid, such as an ink.

The case 20 is made of, for example, a resin such as cyclic polyolefin or polycarbonate or a metal such as aluminum or stainless steel.

2.2. Lid

The lid 30 closes the open end 26 of the case 20. The lid 30 covers the liquid absorber 100 or 200. The liquid absorber 100 or 200 lies between the lid 30 and the bottom 22 of the case 20. The lid 30 may have a thickness of 50 µm to 5 mm, for example, 100 µm to 3 mm. The lid 30 illustrated in FIG. 10 is rectangular but is not limited to such a shape.

The lid 30 has a recessed portion 32 depressed toward the liquid absorber 100 or 200 and an outer portion 34 surrounding the recessed portion 32 when viewed from above. The recessed portion 32 is formed at a position to which ink or any other liquid is discharged. For example, the recessed portion 32 may be formed in a region including the center of the lid 30 when viewed from above.

The recessed portion 32 has a bottom 32a and a sidewall 32b. In the illustrated embodiment, the bottom 32a is rectangular and planar. The sidewall 32b is formed along each side of the bottom 32a. The sidewall 32b surrounds at least a part of the region of the lid 30 to which ink is discharged. The sidewall 32b is joined to the bottom 32a. For discharging ink or any other liquid through the tube 506, the tube 506 is inserted into a space defined by the recessed portion 32, as illustrated in FIG. 9. The recessed portion 32 prevents the discharged bubbly liquid from spilling out. The recessed portion 32 is particularly effective for liquids that contain a large amount of surfactant and are likely to bubble.

The outer portion 34 is the portion of the lid 30 other than the recessed portion 32. In the embodiment depicted in FIG. 10, the outer portion 34 surrounds the recessed portion 32 when viewed from above. The portion of the liquid absorber 100 or 200 between the outer portion 34 and the bottom 22 has a larger thickness than the portion of the liquid absorber 100 or 200 between the recessed portion 32 and the bottom 22.

The lid 30 is provided with through-holes 36 through which liquid passes. The through-holes 36 pass through the lid 30 in the thickness direction. The lid 30 has a surface 30a in contact with the liquid absorber 100 or 200 and a surface 30b opposite the surface 30a. The through-holes 36, which pass from the surface 30a to the surface 30b, define openings 36a at the surface 30a and openings 36b at the surface 30b. In the embodiment illustrated in FIG. 10, the openings 36a and 36b are the same in shape and size. The through-holes 36 are formed in a region of the lid 30 to which liquid is discharged.

The through-holes 36 are formed in the recessed portion 32. In the embodiment illustrated in the drawings, the through-holes 36 are formed in the bottom 32a and the sidewall 32b of the recessed portion 32 and, in addition, in the outer portion 34. The cross section of the through-holes 36 may be quadrilateral. In the illustrated embodiment, the cross section is square. The cross section of the through-holes 36 is not necessarily square and may be in any other shape, such as rectangular, triangular, pentagonal, hexagonal, further polygonal, circular, or oval, or in a star-like shape, such as hexagram.

The number of through-holes 36 is plural and is not particularly limited. In the embodiment illustrated in FIG. 10, the through-holes 36 are arranged in a matrix matter defined by alignments extending in a first direction and alignments extending in a second direction perpendicular to the first direction.

The lid 30 may be made of a resin, and examples of the resin include polypropylene (PP), polystyrene (PS), polyethylene (PE), polyurethane (PU), polyvinyl chloride (PVC), acrylonitrile butadiene styrene (ABS), polymethyl methacrylate (PMMA), acrylonitrile styrene (AS), modified polyphenylene ether (PPE), polycarbonate (PC), polyamide (PA), polybutylene terephthalate (PBT), polyethylene terephthalate (PET), polyphenylene sulfide (PPS), polysulfone (PSU), polyacetal (POM), nylon, polyether ether ketone (PEEK), tetrafluoroethylene-perfluoroalkyl vinyl ether copolymer (PFA), tetrafluoroethylene-ethylene copolymer (ETFE), and polytetrafluoroethylene (PTFE).

Alternatively, the lid 30 may be a mesh member made of stainless steel wires, iron wires, copper wires, or any other metal wires, or a metal member having punched holes. The surfaces 30a and 30b of the lid 30 and the inner walls of the through-holes 36 may be subjected to hydrophobic treatment. Ink is not likely to accumulate on such a lid 30.

The liquid absorbing unit 300 of the illustrated embodiment contains the above-described liquid absorber 100 and/or the liquid absorber 200 in the case 20 (container) and, therefore, can exhibit high absorption even of a liquid having a high ion concentration. Accordingly, the liquid absorbing unit 300 is particularly effective in absorbing liquid with a high ion concentration, such as a dye ink.

3. Liquid Ejection Apparatus

Figure 11:
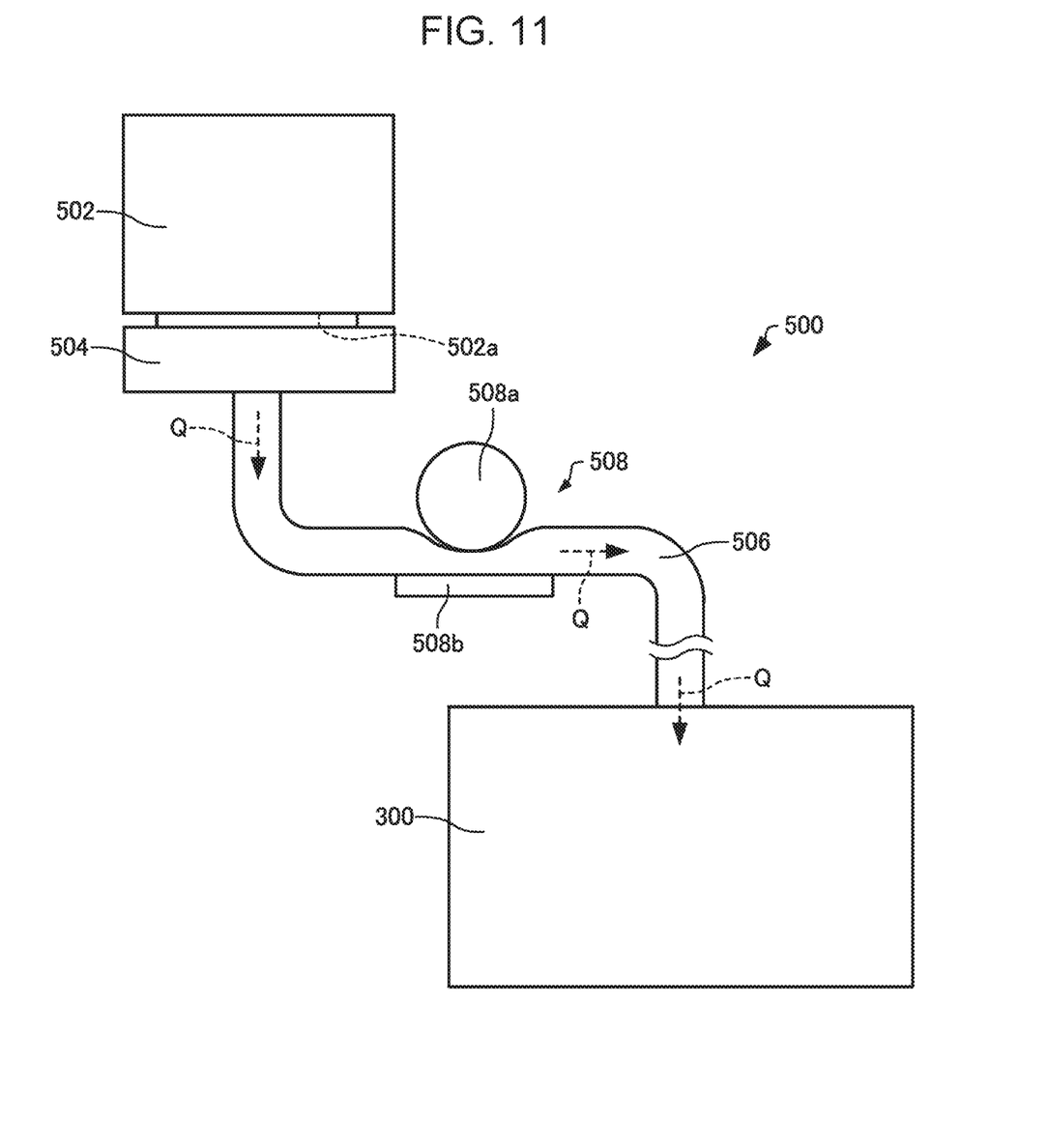
FIG. 11 is a schematic block diagram of a liquid ejection apparatus according to an embodiment of the present disclosure.

A liquid ejection apparatus according to an embodiment of the present disclosure will now be described with reference to some drawings. FIG. 11 is a schematic view of a liquid ejection apparatus 500 according to an embodiment of the present disclosure.

As depicted in FIG. 11, the liquid ejection apparatus 500 includes a liquid ejection head 502 operable to eject a liquid, such as an ink Q, a capping unit 504 to prevent the nozzles 502a of the liquid ejection head 502 from being clogged, a tube 506 connecting the capping unit 504 to a liquid absorbing unit 300, a roller pump 508 operable to pump the ink Q from the capping unit 504, and the liquid absorbing unit 300 operable to collect waste ink Q.

The liquid ejection head 502 has a plurality of nozzles 502a through which the ink Q is ejected downward. The liquid ejection head 502 is operable to print in such a manner as to eject an ink Q onto a printing medium (not shown), such as a PPC (plain paper copier) sheet, while moving across the printing medium.

The capping unit 504 is operable to suck the ink from the nozzles 502a at one time by an operation of the roller pump 508 when the liquid ejection head 502 is at a standby position, thus preventing the nozzles 502a from being clogged.

The tube 506 allows the ink Q sucked by the capping unit 504 to flow to the liquid absorbing unit 300. The tube 506 may be flexible.

The roller pump 508 is disposed at a point along the tube 506. The roller pump 508 includes a roller section 508a and a pinching section 508b that pinches the tube 506 with the cooperation of the roller section 508a. Rotation of the roller section 508a causes the capping unit 504 to suck the ink Q through the tube 506. The ink Q adherent to the nozzles 502a is removed and delivered to the liquid absorbing unit 300 by continuous rotation of the roller section 508a. The ink Q delivered to the liquid absorbing unit 300 is absorbed as waste ink.

The liquid absorbing unit 300 is removably mounted in the liquid ejection apparatus 500. The liquid absorbing unit 300 in the liquid ejection apparatus 500 absorbs the ink Q ejected from the liquid ejection head 502. The liquid absorbing unit 300 is what is called a waste tank. The liquid absorbing unit 300 is replaceable and can be changed to a new one when the absorption of the ink Q reaches the limit.

Whether or not the absorption of ink Q by the liquid absorbing unit 300 reaches the limit can be determined by using a detector (not shown) of the liquid ejection apparatus 500. When the absorption by the liquid absorbing unit 300 reaches the limit, a notification device such as a monitor, built in the liquid ejection apparatus 500 may notify the user of reaching the absorption limit.

The liquid ejection apparatus 500 of the illustrated embodiment includes the liquid absorbing unit 300 and, therefore, can exhibit a high absorption even of a liquid having a high ion concentration. Accordingly, the liquid ejection apparatus 500 is particularly effective in applications using a liquid with a high ion concentration, such as a dye ink.

4. Examples and Comparative Examples

The subject matter of the present disclosure will now be described in detail with reference to Examples. However, the implementation of the subject matter is not limited to the disclosed Examples. In the following description, "part(s)" and "%" are on a mass basis unless otherwise specified.

4.1. Materials of Liquid Absorber

The following materials were used in the Examples and Comparative Examples.

Sheet member: PPC G80 (basis weight: about 4.0 g/sheet), manufactured by Toppan Forms     Absorbent resin: SANFRESH ST-500MPSA (ion-dissociable absorbent resin having a carboxy group on a side chain), produced by Sanyo Chemical Industries     Ion exchange resin: IXE-100 (cation exchange resin), produced by Toagosei     Ion exchange resin: IXE-600 (anion exchange resin), produced by Toagosei 4.2. Preparation of Liquid Absorbers 4.2.1. Samples in which Ion Exchange Resin is Sandwiched in Chips In Examples 1 to 16, the absorbent resin and either or both of the ion exchange resins (the cation exchange resin and/or the anion exchange resin) were mixed in a proportion presented in the Table. Subsequently, water was sprayed onto A4-size sheets for the substrates at a rate of about 2 g/sheet.

Then, for each Example, the above-prepared mixture in an amount corresponding to the mass presented in the Table was uniformly dispersed over the surface of the sheet. The masses (g) presented in the Table represent those per sheet. The resulting sheet was folded in two in such a manner that the surface having the mixture of the materials thereon came inside. When the sheet was folded, it was visually ensured that the dispersed mixture did not fall out of the sheet.

The folded sheet was pinched between a pair of heating blocks of a small press machine H300-01 manufactured by AS ONE Corporation and subjected to heat press at a pressure of 0.3 kg/cm$^2$ and a temperature of 100° C. for 2 minutes. After the heat and pressure were removed, the sheet was allowed to stand at room temperature for 12 hours and then cut into 2 mm×15 mm rectangular small chips with a shredder (Securet F3143SP manufactured by Ishizawa Seisakusho). Thus, masses of chips (liquid absorbers) were prepared for Examples 1 to 16. In these Examples, either the absorbent resin or the ion exchange resin or both were exposed at an end face of any chip.

4.2.2. Samples in which Ion Exchange Resin is Externally Added to Chips

In Examples 4 to 9 and 14 to 16 and Comparative Examples 1 to 4 and 6 to 8, chips include a component externally added to the outside of the chips. In the cases of containing the absorbent resin in the material externally added to the chips, after water was sprayed onto the chips, the chips were dusted with a mixed powder containing the absorbent resin (by shaking a container containing the chips and the mixed powder), followed by hot air drying for evaporating water. In the case of not containing the absorbent resin in the material externally added, the ion exchange resin to be externally added was dispersed in water, and the dispersion liquid was sprayed (with a dispenser) onto the chips, followed by hot air drying for evaporating water. In Comparative Examples 1 to 4, a sheet member with the same mass as in other Examples was cut into small chips as it was; hence the chips did not confine any component therein. In the Examples and Comparative Examples other than Comparative Examples 1 to 4, either the absorbent resin or the ion exchange resin(s) or both were exposed at an end face of any chip.

4.2.3. Samples in which Neither Absorbent Resin Nor Ion Exchange Resin is Exposed at End Face of Chip In Comparative Example 9, the absorbent resin was used. In Comparative Example 10, the absorbent resin and the cation exchange resin were mixed in the proportion presented in the Table.

Figure 12A:
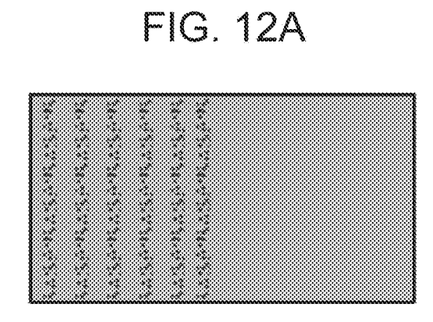
FIGS. 12A to 12F are schematic diagrams illustrating a process for forming small chips in a comparative example.
Figure 12B:
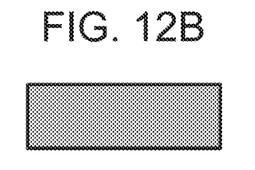
Figure 12C:
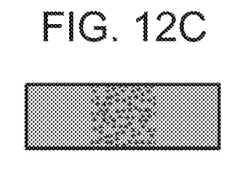

FIGS. 12A to 12F are schematic diagrams illustrating a process for forming small chips in a Comparative Example. Water was sprayed onto A4-size sheet members at a rate of about 2 g/sheet, and half of the area of one side of the sheet member was dusted with the material (the absorbent resin for Comparative Example 9, the mixture of the absorbent resin and the cation exchange resin for Comparative Example 10) at regular intervals as depicted in FIG. 12A, while the other half was not dusted. The resulting sheet member was cut into two types of 2 mm×15 mm rectangular small pieces as depicted in FIGS. 12B and 12C.

Figure 12D:
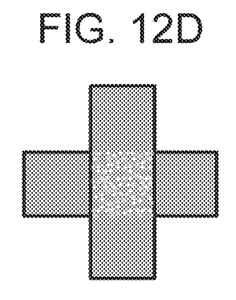
Figure 12E:
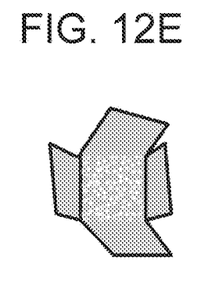
Figure 12F:
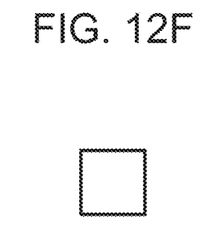

Then, pairs of the two types were overlapped and intersected in such a manner that the absorbent resin or the mixture lay between the two pieces as depicted in FIG. 12D. Then, as depicted in FIG. 12E, the non-overlapped portions of the pieces were folded to wrap the absorbent resin or the mixture, and the resulting piece was pinched between a pair of heating blocks of the small press machine H300-01 and subjected to heat press at a pressure of 0.3 kg/cm$^2$ and a temperature of 100° C. for 2 minutes. After the heat and pressure were removed, the piece was allowed to stand at room temperature for 12 hours. Thus, small chips of Comparative Examples 9 and 10 were obtained (FIG. 12F). In these Examples, neither the absorbent resin nor the ion exchange resin was exposed at an end face of the chip.

4.3. Evaluation of Liquid Absorbers

The dye ink absorbency of the liquid absorbers of the Examples and Comparative Examples was measured by a lay-down test as described below. A dye ink was prepared for the test by mixing the black ink (HSM-BK), the cyan ink (HSM-C), the magenta ink (HSM-M), and the yellow ink (HSM-Y) of a commercially available ink jet ink set, Seiko Epson HSM Dye Ink Set, in a proportion by volume of BK:C:M:Y=3:1:1:1.

The chips (liquid absorber) prepared in each of the Examples and Comparative Examples in an amount equivalent to the entire sheet member were placed in a 200 mL New Disposable Cup manufactured by AS ONE Corporation. Thus, liquid absorbing units of the Examples and Comparative Examples were prepared.

In each of the Examples and Comparative Examples, 100 mL of the dye ink was introduced into the liquid absorbing unit, and the liquid absorbing unit was allowed to stand at 26° C.±1° C. for 30 minutes and 24 hours. After such a time had passed, the liquid absorbing unit was immediately laid down (90° turned) for checking the state of spilled dye ink, and the amount of ink remaining in the container was rated on a 6-point scale according to the following criteria. The results are presented in the Table.

1: No unabsorbed dye ink was observed even though the unit was laid down.

2: A small amount of unabsorbed dye ink was observed after the unit was laid down.

3: It was estimated by the lay-down test that about 25% of dye ink was not absorbed.

4: It was estimated by the lay-down test that about 50% of dye ink was not absorbed.

5: It was estimated by the lay-down test that about 60% of dye ink was not absorbed.

6: It was estimated by the lay-down test that about 75% of dye ink was not absorbed.

TABLE

| | Exposed at an end? | Component sandwiched in chips | | | Component externally added to chips | | | Lay-down test | |
|---|---|---|---|---|---|---|---|---|---|
| | | Absorbent resin (g) | Cation exchange resin (g) | Anion exchange resin (g) | Absorbent resin (g) | Cation exchange resin (g) | Anion exchange resin (g) | 30 min | 24 h |
| Example 1 | Yes | 2.0 | 0.1 | — | — | — | — | 2 | 3 |
| Example 2 | Yes | 2.0 | 1.0 | — | — | — | — | 2 | 2 |
| Example 3 | Yes | 2.0 | 4.0 | — | — | — | — | 1 | 2 |
| Example 4 | Yes | 2.0 | 0.1 | — | — | — | 1.0 | 2 | 2 |
| Example 5 | Yes | 2.0 | 1.0 | — | — | — | 1.0 | 1 | 1 |
| Example 6 | Yes | 2.0 | 0.4 | — | — | — | 1.0 | 1 | 1 |
| Example 7 | Yes | 2.0 | 0.1 | — | — | — | 4.0 | 2 | 1 |
| Example 8 | Yes | 2.0 | 1.0 | — | — | — | 4.0 | 1 | 1 |
| Example 9 | Yes | 2.0 | 4.0 | — | — | — | 4.0 | 1 | 1 |
| Example 10 | Yes | 2.0 | 1.0 | 1.0 | — | — | — | 2 | 2 |
| Example 11 | Yes | 2.0 | — | 0.1 | — | — | — | 4 | 4 |
| Example 12 | Yes | 2.0 | — | 1.0 | — | — | — | 3 | 4 |
| Example 13 | Yes | 2.0 | — | 4.0 | — | — | — | 3 | 3 |
| Example 14 | Yes | 2.0 | — | 4.0 | — | 4.0 | — | 3 | 3 |
| Example 15 | Yes | 2.0 | — | 4.0 | — | — | 4.0 | 3 | 3 |
| Example 16 | Yes | 2.0 | — | 4.0 | — | 4.0 | 4.0 | 3 | 3 |
| Comparative Example 1 | Yes | — | — | — | 2.0 | — | — | 6 | 5 |
| Comparative Example 2 | Yes | — | — | — | 2.0 | 4.0 | — | 5 | 4 |
| Comparative Example 3 | Yes | — | — | — | 2.0 | — | 4.0 | 5 | 4 |
| Comparative Example 4 | Yes | — | — | — | 2.0 | 4.0 | 4.0 | 5 | 4 |
| Comparative Example 5 | Yes | 2.0 | — | — | — | — | — | 5 | 4 |
| Comparative Example 6 | Yes | 2.0 | — | — | — | 4.0 | — | 5 | 3 |

TABLE-continued

| | Exposed at an end? | Component sandwiched in chips | | | Component externally added to chips | | | Lay-down test | |
| | | Absorbent resin (g) | Cation exchange resin (g) | Anion exchange resin (g) | Absorbent resin (g) | Cation exchange resin (g) | Anion exchange resin (g) | 30 min | 24 h |
|---|---|---|---|---|---|---|---|---|---|
| Comparative Example 7 | Yes | 2.0 | — | — | — | — | 4.0 | 5 | 4 |
| Comparative Example 8 | Yes | 2.0 | — | — | — | 4.0 | 4.0 | 5 | 3 |
| Comparative Example 9 | No | 2.0 | — | — | — | — | — | 6 | 6 |
| Comparative Example 10 | No | 2.0 | 1.0 | — | — | — | — | 6 | 6 |

4.4. Evaluation Results

The Table suggests that the liquid absorbers of the Examples exhibited satisfactory absorption of the dye ink. The liquid absorbers of the Examples include a plurality of small chips, and the individual chips include a first substrate containing fibers, a second substrate containing fibers, and an absorbent resin and an ion exchange resin between the first substrate and the second substrate, in which at least one of the absorbent resin and the ion exchange resin is exposed at an end face of the chips.

On the other hand, in Comparative Examples 1 to 8, in which the absorbent resin was not supported or only the absorbent resin was supported, the liquid absorbers did not exhibit sufficient absorption of the dye ink even though the absorbent resin was exposed at an end face of the chips. Furthermore, in Examples 9 and 10, in which neither the absorbent resin nor the cation exchange resin was exposed at an end face, the liquid absorber did not exhibit sufficient absorption of the dye ink even though the absorbent resin and the cation exchange resin were supported.

Also, the comparison between Examples 5 and 10 suggests that the anion exchange resin externally added is more effective than the anion exchange resin sandwiched between the substrates.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. A liquid absorber comprising a plurality of small chips, individual ones of the small chips including:
   a first substrate containing fibers;
   a second substrate containing fibers;
   an absorbent resin supported between the first substrate and the second substrate; and
   ion exchange resin supported between the first substrate and the second substrate,
   wherein
   at least one of the absorbent resin and the ion exchange resin is exposed at an end face of the chips, and
   an average length of the fibers contained in the first and second substrates is 0.1 mm to 7.0 mm.

2. The liquid absorber according to claim 1, wherein the mass ratio of the ion exchange resin to the absorbent resin is from 0.05 to 2.00.

3. A liquid absorbing unit comprising:
   the liquid absorber as set forth in claim 1; and
   a container containing the liquid absorber.

4. A liquid ejection apparatus comprising:
   a liquid ejection head operable to eject a liquid; and
   the liquid absorbing unit as set forth in claim 3, the liquid absorbing unit being operable to absorb the liquid.

* * * * *